Sept. 9, 1930.   G. M. FERGUSON ET AL   1,775,276
MEANS FOR INTERCEPTING RADIANT ENERGY Filed April 24, 1926

Inventors:
GEORGE M. FERGUSON & PHILIP E. HARTH,
By John H. Bruninga.
Their Attorney.

Patented Sept. 9, 1930

1,775,276

UNITED STATES PATENT OFFICE

GEORGE M. FERGUSON, OF JERSEY CITY, NEW JERSEY, AND PHILIP E. HARTH, OF ST. LOUIS, MISSOURI, ASSIGNORS TO NATIONAL PIGMENTS & CHEMICAL COMPANY, OF ST. LOUIS, MISSOURI, A CORPORATION OF MISSOURI

MEANS FOR INTERCEPTING RADIANT ENERGY

Application filed April 24, 1926. Serial No. 104,439.

This invention pertains to means for intercepting radiant energy such as electro-magnetic or electrostatic radiation, and more particularly to the protection of electrical apparatus from interference effects of such radiation.

It is well known that practically all kinds of electrical apparatus, and more particularly such devices as are used for radio transmission and reception, usually give off during operation radiation of various kinds. In the following discussion such radiation generally will be termed radiant energy. It is well known that the various elements of the apparatus are usually surrounded by electrostatic or magnetic fields, and during the operation of the apparatus these fields are usually caused to oscillate rapidly and under certain conditions these oscillating fields, whether electrostatic or magnetic, cause impulses to be transmitted to the surrounding ether and propagated outwardly through the space surrounding the apparatus.

This type of radiation has geen generally designated by the name of Hertzian waves, after the investigator who first proved their existence experimentally. The term "Hertzian waves" will, therefore, be adopted, for the purpose of this specification and the appended claims, to designate this type of radiation and to distinguish from other types of radiant energy such as light and heat radiation.

In such sensitive types of apparatus as are used in radio work, such radiations set up by one element are liable to affect the operation of other elements which may be in their path. This effect is well known to workers in the radio field, and is generally classed as interference, interstage coupling and oscillation. Such an interference may be caused by radiation set up by the different reactive elements such as transformers, coupling coils, condensers, etc., which impinge upon or react with other elements of the same set or of other sets in the vicinity thereof.

In radio work, and more particularly in receiving sets, attempts have been made to eliminate the effects of such radiation by shielding the various elements by means of a metal shield. This may take the form of plain shielding plates, or of enclosures more or less completely housing certain elements. While such an arrangement is more or less effective in reducing interference, it also reduces the efficiency of the element. This is accounted for by the fact that the radiation intercepted by the shield sets up therein eddy currents. The shield being metallic and a good conductor, such eddy currents are usually set up and as they perform no useful service, but represent energy dissipated in the shield, they accordingly reduce the amount of energy available for operating the apparatus, and cause what is known as losses.

One of the objects of this invention, therefore, is to provide means for intercepting such radiation which will be effective in cutting down interference, but which will obviate the loss incident to such protection.

Another object is to provide a non-conducting medium capable of intercepting such radiation, in order to reduce the effects thereof.

Another object is to provide means for protecting electrical apparatus from the effects of such radiation without seriously reducing the efficiency thereof.

Further objects will appear from the following description taken in connection with the accompanying drawing, in which Figure 1 is a diagram representing a radio receiving set and in which are represented in diagrammatic form screens or shields for the various elements applied in accordance with this invention.

This invention is based on the discovery of the fact that barium sulphate, (such as barytes having a large proportion of barium sulphate) when used for instance, as an ingredient, endows the article constructed thereof with the property of intercepting radiant energy. This property has been described in Patent No. 1,576,730, issued March 16, 1926, in which its property for intercepting X-rays was described. Barium sulphate also has the property of obstructing or intercepting other forms of radiant energy, or more particularly electro-magnetic radiation.

It has been pointed out that material having as an ingredient barium sulphate which may be held together by a suitable binder, such as phenolic condensation product, hard rubber, plaster of Paris, pitch, or other suitable material, may be made up as a plastic molding material or formed into sheets or plates. Such a material and method for preparing the same is described in co-pending application Serial No. 74,505, filed December 10, 1925. It has been found that practically any percentage of barium sulphate as an ingredient from ten percent up, may be used effectively for screening out electro-magnetic radiation. Accordingly the material is cheap to prepare.

Figure 1:
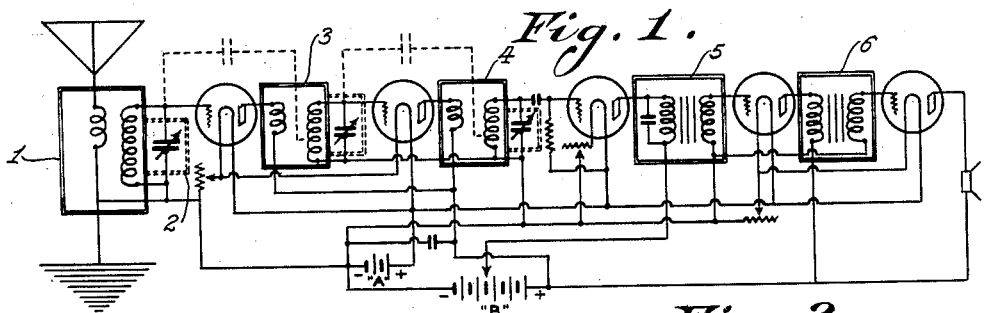

In accordance with the present invention such material is formed into screens or shields which may be applied in such places as required to intercept radiant energy and particularly magnetic and electro-static radiation as pointed out above. In Figure 1, a radio receiving set is shown in diagrammatic form. In this figure, 1 represents a housing of any suitable form constructed of material containing barium sulphate as above described and arranged to enclose the coil or transformer which couples the antenna circuit with the first amplifying step of the set. The double line in this figure represents the shielding enclosure. While this is shown as completely housing the coil, it may be applied simply as a plate placed between this coil and other parts to be shielded. Such a screen is adapted to intercept radiation passing either to or from the coil or other element to which it is applied. Such a screen may be applied to any or all of the reactive elements of the set such as condensers, transformers, or other coils, or even enclose the entire set. In Figure 1, an enclosure 2, is represented on dotted lines enclosing the first variable condenser. Such an enclosure may be made a part of the enclosure 1, or may be separate, as circumstances may require. Similar screens may be provided for the other reactive elements of the set. Thus enclosures 3 and 4 are shown applied to the first and second steps of radio amplification, while 5 and 6 represent screens for the audio transformer coils.

Figure 2:
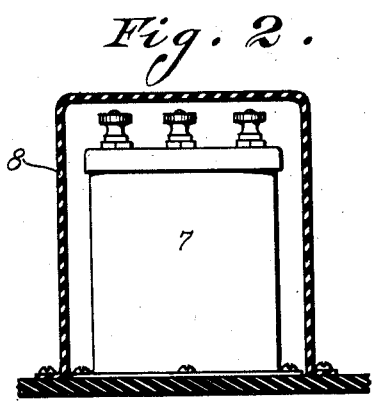
Figure 2 represents a radio frequency transformer having applied thereto a shield constructed in accordance with this invention.

In Figure 2, 7 represents a radio frequency transformer which is shown enclosed by a housing 8, constructed of the above described barium sulphate containing material so as to intercept radiation passing to or from the coil 7.

Figure 3:
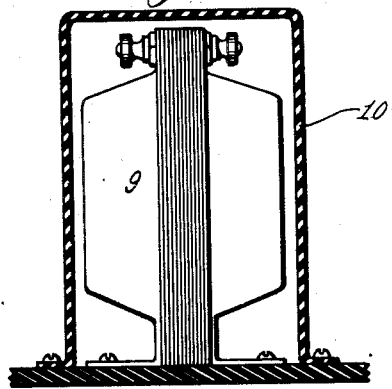
Figure 3 represents an audio frequency transformer having a similar shield applied thereto.
Figure 4:
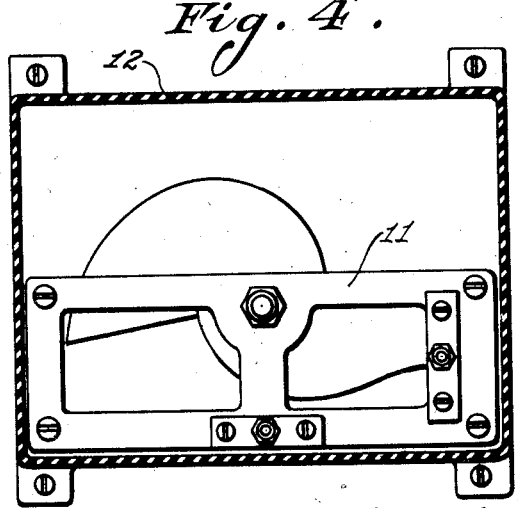
Figure 4 represents a variable condenser protected by a screen embodying this invention.

In Figure 3, 9 represents an audio frequency transformer, and 10 an enclosure similar to the enclosure 8. Similarly in Figure 4, the condenser 11 is shielded by the enclosure 12. In all of these cases the enclosure may be formed of the above described material molded in plastic form, or may be built up of plates, or by any other suitable construction. In any case the material is adapted to intercept radiation passing to or from the enclosed devices.

Figure 5:
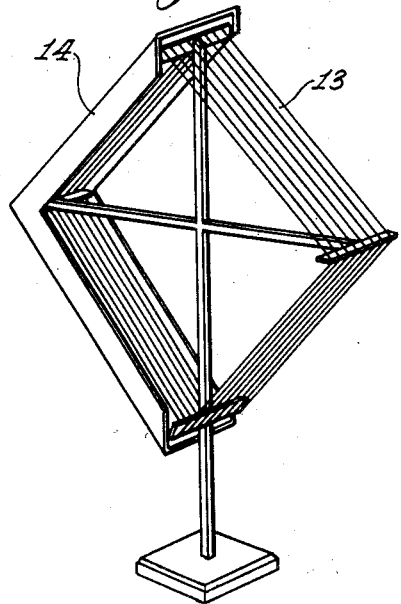
Figure 5 represents a loop aerial having a protecting shield embodying this invention applied to one side thereof.

In Figure 5 is shown a loop antenna 13, which has applied to one side thereof an enclosure 14, constructed of barium sulphate containing material and adapted to intercept radiation passing to or from the coil 13 on one side only. Bearing in mind the well known direction finding properties of a loop antenna, it will be seen that the shield 14 renders one side of the loop "blind" to radiation to or from that side. It will be clear therefore that such a loop will have more marked direction finding characteristics, either when used as a receiving antenna or as a sending antenna. Accordingly more accurate selection of directions may be obtained by this construction.

It will be clear therefore that this invention provides novel means for protecting electrical apparatus from the disturbing effects of radiant energy. The barium sulphate material being a non-conductor is incapable of supporting eddy currents, at any rate to an appreciable extent, while at the same time it cuts off the magnetic and electro-static radiation. It is therefore capable of effectively screening the various reactive elements of an electrical apparatus from the interfering effects of each other. Of course, such screening effect also protects the apparatus against interference by stray radiation from near-by apparatus such as radio stations. Consequently a radio set may be completely protected against any impulses received otherwise than through its own antenna. As the screening material may be made up into practically any form, it is possible to properly house practically any type of apparatus without waste of space.

While various applications of this invention have been described, it will be understood that such applications are simply illustrations of various embodiments of this invention; for it will be understood that this invention is susceptible of various other embodiments. The composition containing barium sulphate may be used as a screen for various other apparatus, such as sensitive shells and other elements in telephone and telegraph systems. It may also be used to screen the conductors in radio receiving and transmitting apparatus; thus it may be provided as an insulating covering for the various leads and may in such case be either applied directly to the wires or conductors or in the form of tubing. It may also be used as a screen surrounding electron tubes and their bases as well as the leads therefrom and thereto.

It will further be understood that while a material which has been found particularly suitable is barium sulphate preferably incorporated with a binder, this invention is not limited to such a material but other materials having the characteristics and properties of barium sulphate for the purpose described may be used.

It will further be understood that while a theory has been advanced, it is not contended that such theory is the necessary, essential or only theory, but has been advanced in order to facilitate the disclosure and understanding of this invention; it is, therefore, to be understood that this invention is not limited to any particular theory.

It is obvious that various changes may be made in details of construction without departing from the spirit of this invention; it is, therefore, to be understood that this invention is not to be limited to the specific details shown and described.

Having thus described the invention, what is claimed is:

1. An insulating screen having the property of intercepting Hertzian waves.

2. An insulating screen containing barium and having the property of intercepting Hertzian waves.

3. An insulating screen having as an ingredient a barium salt, and having the property of intercepting Hertzian waves.

4. An electrical apparatus, in combination with an insulating screen adapted to intercept Hertzian waves.

5. An electrical apparatus, in combination with an insulating screen containing barium adapted to intercept Hertzian waves.

6. An electrical apparatus, in combination with an insulating screen adapted to intercept Hertzian waves passing to or from the apparatus.

7. In an electrical apparatus, a reactive element, and an insulating screen for said element adapted to intercept Hertzian waves.

8. In an electrical apparatus, a reactive element, and an insulating screen for said element containing barium adapted to intercept Hertzian waves.

9. In an electrical apparatus, a reactive element, and an insulating screen for said element containing as an ingredient a barium salt adapted to intercept Hertzian waves.

10. In an electrical apparatus, a reactive element, and an insulating screen for said element composed of barium sulphate with a suitable binder and adapted to intercept Hertzian waves.

11. In an electrical apparatus, a reactive element, and an insulating screen for said element composed of barium sulphate with a phenolic condensation product and adapted to intercept Hertzian waves.

12. In an electrical apparatus, a plurality of reactive elements, and an insulating screen between adjacent elements adapted to intercept Hertzian waves.

13. In an electrical apparatus, a plurality of reactive elements, and an insulating screen enclosing one of said elements adapted to intercept Hertzian waves.

14. In an electrical apparatus, a plurality of reactive elements, and an insulating screen enclosing one of said elements, said screen being composed of barium sulphate and a suitable binder and adapted to intercept Hertzian waves.

15. In an electrical apparatus, a coil having associated therewith an insulating screen adapted to intercept Hertzian waves.

16. In an electrical apparatus, a coil having associated therewith an insulating screen adapted to intercept Hertzian waves passing to and from said coil in a certain direction.

17. In an electrical apparatus, a coil having associated therewith an insulating screen composed of barium sulphate and a suitable binder, and adapted to intercept Hertzian waves.

18. An insulating housing for an electrical reactive element composed of barium sulphate and a binder of phenolic condensation product.

In testimony whereof we hereunto affix our signatures.

GEORGE M. FERGUSON.
PHILIP EDWARD HARTH.